May 19, 1931. C. C. FARMER 1,805,617
BRAKE RELEASE DEVICE
Filed Feb. 18, 1930
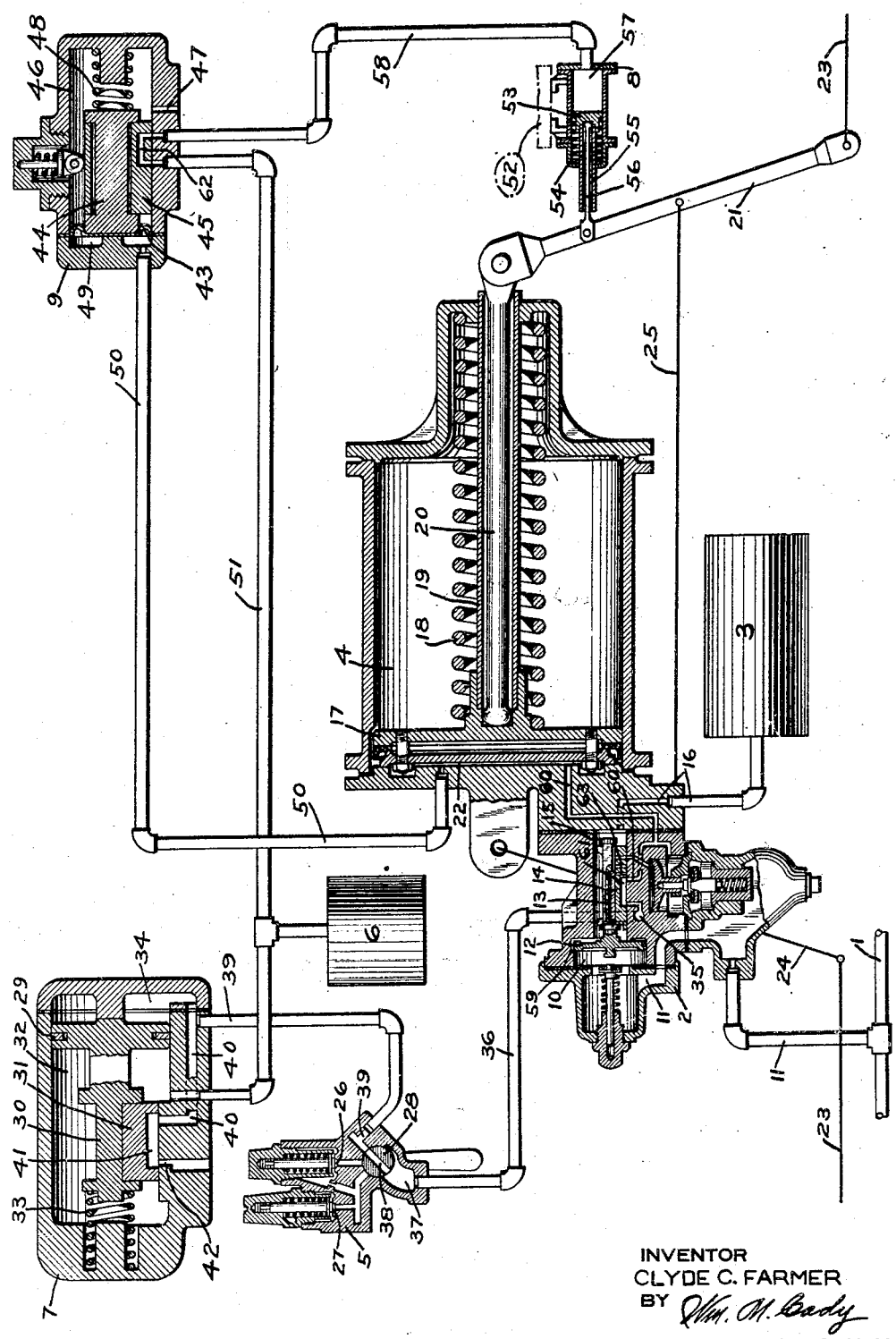
INVENTOR
CLYDE C. FARMER
BY *Wm. M. Cady*
ATTORNEY Patented May 19, 1931

1,805,617

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE RELEASE DEVICE

Application filed February 18, 1930. Serial No. 429,288.

This invention relates to vehicle brakes and more particularly to brakes for use on railway rolling stock, and has for its principal object, the provision of a brake having fluid pressure controlled means for moving the usual brake rods and levers to their release positions and for maintaining them in release positions.

In some types of vehicle brakes, release springs are employed for effecting the release movement of the several brake rods and levers of the brake rigging and for maintaining them in their release positions. The use of such release springs is somewhat objectionable in that, if such springs should weaken or break, the brake shoes, in releasing the brakes, might not be moved free of the vehicle wheels and would drag thereon. A further objectionable feature is that the power of the release springs offers considerable resistance to the power transmitted from the brake cylinder to the brake shoes.

Another object of my invention is to provide a vehicle brake rigging which will be free of the above mentioned objectionable features.

A further object of my invention is to provide a brake releasing mechanism which, in releasing the brakes, is adapted to cooperate with the usual operatively connected brake levers and brake rods of a vehicle brake to move them to and maintain them in their release positions, and which will offer no resistance to the movement of said levers and rods to their application positions.

A still further object of my invention is to provide fluid pressure controlled means for moving the brake levers and brake rods of a brake rigging to their release position and which will have no effect on the brake rigging when the brakes are applied and partially released when cycling the brakes on a descending grade.

Other objects and advantages will appear in the following more detailed description of the invention.

In the accompanying drawing, the single figure is a diagrammatic view, mainly in section, of a brake equipment embodying my invention.

As shown in the drawing, the brake equipment may comprise a brake pipe 1, a triple valve device 2, an auxiliary reservoir 3, a brake cylinder 4, a retaining valve device 5, a release reservoir 6, a release reservoir charging valve device 7, a brake releasing piston device 8 and a control valve device 9.

The triple valve device 2 may comprise a casing having a chamber 10 which is connected to the brake pipe 1 through a pipe and passage 11, and which contains a piston 12 adapted to operate an auxiliary slide valve 13 and a main slide valve 14 contained in a chamber 15 which is constantly connected to the auxiliary reservoir 3 through a passage and pipe 16.

Mounted in the brake cylinder 4 is a piston 17 which is subject, on one side, to the pressure of a spring 18. Projecting from the spring side of this piston and extending through an opening in the non-pressure head of the brake cylinder is a hollow piston rod 19 in which there is loosely mounted a push rod 20. Beyond the outer end of the hollow piston rod 19, the outer end of the push rod is operatively connected to one end of a brake cylinder lever 21. The inner end of the push rod 20 is adapted to be operatively engaged by the piston 17 when said piston is caused to move outwardly by fluid under pressure supplied to a chamber 22 at the pressure side of the piston, in effecting an application of the brakes. Since the push rod 20 is loosely mounted in the hollow piston rod 19, the rod 20 may be moved relative to the piston rod 19 thus permitting a manual application of the brakes to be effected without moving the piston 17.

The opposite end of the cylinder lever 21 is connected to a pull rod 23 which is adapted to transmit power from the cylinder lever to the brake shoes at one end of the vehicle through the usual brake levers and rods (not shown). In the type of brake shown in the drawing, there is also a brake cylinder lever 24, which at one end is pivotally connected to a lug formed on the pressure head of the brake cylinder, the opposite end of the lever being operatively connected to a second pull rod 23 for transmitting power from the lever 24 to the brake shoes at the other end of the vehicle. These brake cylinder levers 21 and 24 are operatively connected together intermediate their ends, by the usual tension rod 25.

The brake cylinder pressure retaining valve device shown in the drawing is of the usual double pressure type comprising a casing in which the retaining valves 26 and 27 and a plug valve 28 are mounted. The plug valve is adapted to be rotated by a handle 29 to a direct release position as shown in the drawing, and to two different positions for maintaining predetermined pressures in the brake cylinder in cycling operations.

The release reservoir charging valve device may comprise a casing containing a movable abutment which, as shown in the drawing, may be in the form of a piston 29, having a stem 30 operatively engaging a slide valve 31 contained in a chamber 32. Also contained in this chamber 32, and interposed between and engaging the casing and the free end of the stem 30, is a spring 33, the pressure of which at all times tends to maintain the piston in its extreme right hand position, as shown in the drawing. At the other side of the piston 29, there is a chamber 34, to which the usual brake cylinder exhaust passage 35 in the triple valve device 2 is connected by way of a pipe 36, a valve chamber 37 in the retaining valve device 5, a passage 38 through the plug valve 28, a passage and pipe 39, and a passage 40. The passage 40, besides leading to the piston chamber 34, also leads to the seat for the slide valve 31, so that when the piston 29 and slide valve are in their extreme right hand positions, the passage 40 is connected to the atmosphere through a cavity 41 in the slide valve 31 and a restricted passage 42.

The control valve device 9 is employed for the purpose of controlling the operation of the piston device 8 and may comprise a casing having a flexible diaphragm 43 adapted to control the operation of a follower member 44 having a slide valve 45 operatively connected therewith, the follower member and slide valve being contained in a chamber 46 at one side of the diaphragm 43, which chamber is normally connected to the atmosphere through a passage 47. Also contained in this valve chamber 46 is a spring 48 which is interposed between and engages one end of the follower member 44 and the casing. The pressure of this spring at all times tends to force the follower member 44 and diaphragm 43 to their extreme left hand positions as shown in the drawing. The chamber 49 at the other side of the flexible diaphragm and the pressure chamber 22 in the brake cylinder are constantly connected together through a pipe 50.

The release reservoir 6 is constantly connected to the valve chamber 32 in the charging valve device 7 through a pipe 51, which pipe also leads to the seat for the control slide valve 45.

The piston device 8 may comprise a casing which is rigidly secured to a fixed part 52 of the body of the vehicle. Contained in this casing is a piston 53 which is subject on one side to the pressure of a spring 54. Projecting outwardly from the spring side of the piston 53 and through an opening in the non-pressure head of the device is a hollow piston rod 55 in which there is loosely mounted a push rod 56, the outer end of said push rod being operatively connected to the cylinder lever 21 at a point intermediate the end of the lever which is connected with the push rod 20 of the brake cylinder and the point of connection of the rod 25 and lever. At the other side of the piston 53 there is a chamber 57 which is connected to the seat for the control slide valve 45, through a pipe 58.

Assuming the retaining valve device to be in its direct release position and the several other parts of the equipment to be in their release positions, all as shown in the drawing, the auxiliary reservoir 3 is maintained charged with fluid under pressure supplied in the usual manner from the brake pipe 1 by way of pipe and passage 11, triple valve piston chamber 10, feed groove 59 around the piston 12, slide valve chamber 15 and passage and pipe 16.

With the triple valve device in release position, the brake cylinder chamber 22 is vented to the atmosphere by way of a passage 60, a cavity 61 in the main slide valve 14 of the triple valve device, passage 35, pipe 36, passage 37 in the retaining valve device 5, passage 38 in the plug valve 28, passage and pipe 39, passage 40 in the charging valve device 7, cavity 41 in the slide valve 31 and restricted passage 42. Since the chamber 49 in the control valve device is constantly connected to the brake cylinder chamber 22, through pipe 50, it is consequently vented to the atmosphere.

The pressure of the spring 33 maintains the piston 29 and slide valve 31 in their extreme right hand positions and the pressure of the spring 48 maintains the follower member 44 and slide valve 45 in their extreme left hand positions, so that fluid under pressure supplied to the release reservoir 6 during a previous application of the brakes, as will hereinafter appear, will flow to the piston chamber 57 in the piston device 8 by way of pipe 51, a cavity 62 in the control slide valve 45 and pipe 58, thus maintaining the piston 53 and push rod 56 of the device 8 in their extreme outer positions and thereby maintaining the cylinder lever 21 and connected levers and rods in their release positions against the pressure of the spring 54.

To effect an application of the brakes, the brake pipe pressure is reduced in the usual manner, and upon effecting such a reduction, the triple valve piston 12 moves outwardly from its release position, causing the graduating slide valve 13 to first move relatively to the main slide valve 14, and by such movement uncover a service port 63 in the main slide valve. Continued outward movement of the piston 12 causes the main slide valve to move to application position in which the service port 63 registers with the brake cylinder passage 60, so that fluid under pressure supplied to the slide valve chamber 15 from the auxiliary reservoir 3 by way of pipe and passage 16, flows to the chamber 22 in the brake cylinder through passage 60.

From the brake cylinder piston chamber 22, fluid under pressure thus supplied thereto flows to the diaphragm chamber 49 in the control valve device 9, and when the pressure of fluid in this chamber, acting on one side of the diaphragm 43, is sufficient to overcome the pressure of the spring 48 acting on the other side of the diaphragm through the medium of the follower member 44, the diaphragm will be caused to flex toward the right hand, shifting the member 44 and the slide valve 45 to their extreme right hand positions. With the slide valve 45 in this position, the cavity 62 in the slide valve establishes communication from the pipe 58 to the passage 47, thus venting fluid under pressure from the piston chamber 57 in the piston device 8, to the atmosphere. With this chamber 57 thus vented, the pressure exerted by the spring 54 causes the piston 53 to move, relative to the push rod 56, to its extreme inner position.

Now, as the pressure of fluid is being built up in the brake cylinder piston chamber 22, the brake cylinder piston 17 is caused to move outwardly, compressing the spring 18 and operating the push rod 20 to apply power to the brake cylinder lever 21 and the usual rods and levers associated with the brake cylinder lever, to force the usual brake shoes in frictional engagement with the wheels of the vehicle.

It will here be noted that since the piston 53 of the piston device 8 has been moved to its innermost position and out of engagement with the push rod 56 before the piston 17 has started to move outwardly to effect an application of the brakes, the piston device will offer no resistance to the movement of the brake leverage system as the several parts of the system are moved to application position. As the brake cylinder lever 21 is moved in applying the brakes, the push rod 56 slides freely in the hollow piston stem 55.

To release the brakes, the brake pipe pressure is increased in the usual manner, causing the triple valve device to operate to release position in which the auxiliary reservoir is recharged and in which the brake cylinder passage 60 is connected to the exhaust passage 35 by way of the cavity 61 in the main slide valve 14 of the triple valve device. Fluid under pressure from the brake cylinder piston chamber 22 and from the diaphragm chamber 49, in the control valve device 9, which chamber 49 is connected to the chamber 22 through pipe 50, now flows to the atmosphere by way of brake cylinder passage 60, cavity 61 in the main slide valve 14 of the triple valve device 2, passage 35, pipe 36, passage 37 in the retaining valve device 5, passage 38 in the plug valve 28, passage and pipe 39, passage 40, cavity 41 in the slide valve 31 of the release reservoir charging valve device 7 and restricted passage 42.

From the passage 40, fluid under pressure is also supplied to the piston chamber 34 in the charging valve device 7, and due to the restricted flow of fluid through the passage 42, the pressure of fluid will build up in the piston chamber 34 and when this pressure, acting on one side of the piston 29, is sufficient to overcome the opposing pressure of the spring 33, the piston will move to its extreme left hand position, carrying the slide valve 31 with it.

With the slide valve 31 in its extreme left hand position, the communication from the passage 40 to the atmospheric passage is closed and communication from the passage 40 to the pipe 51 is established by the slide valve 31 uncovering the passage 40. Fluid under pressure from the passage 40 now flows to the reservoir 6 through the valve chamber 32 and pipe 51, thus charging the release reservoir.

When the brake cylinder pressures present in the chambers 32 and 34 at opposite sides of the piston 29 are substantially equal, the pressure of the spring 33 causes the piston and slide valve 31 to be returned to their extreme right hand positions in which the passage 40 is again connected to the passage 42, so that fluid under pressure from the brake cylinder piston chamber 22 and diaphragm chamber 49 in the control valve device 9 continues to flow to the atmosphere until these chambers are completely vented.

As the pressure of fluid in the brake cylinder piston chamber reduces, the pressure of the spring 18 causes the piston 17 and piston rod 19 to move toward the left hand relative to the push rod 20 and when the piston is in substantially its release position, as shown in the drawing, and the pressure of fluid in the diaphragm chamber 49, in the control valve device 9, is reduced sufficiently, the pressure of the spring 48 causes the follower member 44 to be shifted to its extreme left hand position, flexing the diaphragm and shifting the slide valve 45 to a position in which the cavity 62 connects the pipe 51 and pipe 58 so that fluid under pressure from the charged release reservoir flows to the piston chamber 57 in the piston device 8 and causes the piston 53 and push rod to move outwardly. The outward movement of this piston compresses the spring 54 and the outward movement of the push rod 56 causes the lever 21 to operate to return the brake cylinder push rod 20 to its normal release position, as shown in the drawing, and to return the several brake rods and levers to their release positions. It will be noted that when the brake rods and levers are returned to their release positions, they will be maintained in these positions by the piston device 8, since there are no means provided for venting fluid under pressure from the chamber 57 to the atmosphere until an application of the brakes is initiated as before described nor is there any means for venting fluid under pressure from the release reservoir 6.

Should the plug valve 28 of the brake cylinder pressure retaining valve device 5 be rotated from its direct release position, as shown in the drawing, to either one of its two brake cylinder pressure retaining positions for retaining a predetermined pressure in the brake cylinder in cycling on a descending grade, the release charging valve device will be rendered ineffective and will remain in the position shown in the drawing so long as the plug valve is turned to either brake cylinder pressure retaining position.

When an application of the brakes is effected with the retaining valve device 5 in a brake cylinder pressure retaining position, fluid under pressure is supplied to the brake cylinder piston chamber 22 and to the diaphragm chamber 49 in the control valve device 9, causing the control valve device to operate to vent the piston chamber 57 in the piston device and also causing the brake cylinder piston 17 to move outwardly and operate the brake levers and rods to apply the brake shoes to the vehicle wheels, all in the same manner as before described in connection with a service application.

Now, when the triple valve device is operated to release position, the retaining valve device 5 will maintain a predetermined pressure in the brake cylinder piston chamber 22 and in the diaphragm chamber 49 in the control valve device. The pressure of fluid maintained in the chamber 49 and acting on one side of the diaphragm is sufficient to maintain the follower member 44 and slide valve 45 in their right hand positions against the pressure exerted by the spring 48, so that the piston chamber 57 of the piston device is connected to the atmosphere, thus rendering the piston device ineffective to influence, in any way, the operation of the brake in effecting an application or partial release of the brakes.

Should the plug valve be turned again to its direct release position, the mechanism will again operate to return the brake levers and rods to their full release positions.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake, the combination with a mechanism operative to effect an application of the brakes and operative to effect the release of the brakes, of fluid pressure means operative to apply braking power to said mechanism and operative to relieve said mechanism of braking power, and pneumatic means for operating said mechanism to release position when the mechanism is relieved of braking power and for maintaining said mechanism in release position.

2. In a vehicle brake, the combination with a mechanism operative to effect an application of the brakes and operative to effect the release of the brakes, of fluid pressure means operative to apply braking power to said mechanism and operative to relieve said mechanism of braking power, and means subject to fluid under pressure supplied by said fluid pressure means as the fluid pressure means are operated to relieve the mechanism of braking power for operating said mechanism to release position and for maintaining the mechanism in release position.

3. In a vehicle brake, the combination with a mechanism operative to effect an application of the brakes and operative to effect the release of the brakes, of means subject to fluid under pressure for normally maintaining said mechanism in release position, a device subject to fluid under pressure for applying braking power to said mechanism, and valve means subject to the pressure of fluid in said device for rendering said means ineffective to oppose the braking power applied to said mechanism.

4. In a vehicle brake, the combination with a mechanism operative to effect an application of the brakes and operative to effect the release of the brakes, of means subject to fluid under pressure for normally maintaining said mechanism in release position, a device subject to fluid under pressure for applying braking power to said mechanism, and valve means subject to the pressure of fluid in said device to vent fluid under pressure from said means for rendering said means ineffective to oppose the braking power applied to said mechanism.

5. In a vehicle brake, the combination with a mechanism operative to effect an application of the brakes and operative to effect the release of the brakes, of a device operative by fluid under pressure to apply braking power to said mechanism and operative upon the release of fluid under pressure therefrom to relieve the braking power on said mechanism, means operative at one time by fluid under pressure released from said device for operating said mechanism to release position and operative, at another time, upon the venting of fluid therefrom, to a position in which it will not influence the operation of said mechanism, and valve means subject to the pressure of fluid in said device for controlling the supply of fluid under pressure to said means and the venting of fluid therefrom.

6. In a vehicle brake, the combination with a mechanism operative to effect an application of the brakes and operative to effect the release of the brakes, of a device operative by fluid under pressure to apply braking power to said mechanism and operative upon the release of fluid under pressure therefrom to relieve the braking power on said mechanism, a reservoir, pressure sensitive means subject to the pressure of fluid released from said device for supplying fluid under pressure released from said device to said reservoir, a piston device operative by fluid under pressure for operating said mechanism to release position, and means controlled by the pressure of fluid in said device for at one time supplying fluid under pressure from said reservoir to said piston device and for at another time closing off the flow of fluid from said reservoir to said piston device and for venting fluid under pressure from said piston device.

7. In a vehicle brake, the combination with a mechanism operative to effect an application of the brakes and operative to effect the release of the brakes, said mechanism comprising a brake cylinder lever, of a brake cylinder device operative to apply braking power to said lever to effect an application of the brakes and operative to relieve said lever of said braking power in effecting a release of the brakes, and fluid pressure controlled means operative, in effecting the release of the brakes, to apply power to said lever to operate said mechanism to release position and to maintain said mechanism in release position.

8. In a vehicle brake, the combination with a mechanism operative to control the application and release of the brakes, of fluid pressure controlled means for controlling the operation of said mechanism, and means controlled by fluid under pressure supplied from said fluid pressure controlled means for at one time operating said mechanism to release position and for maintaining the mechanism in release position and for at another time rendering said means ineffective to influence the operation of said mechanism.

9. In a vehicle brake, the combination with a mechanism operative to control the application and release of the brakes, of a brake cylinder device operative by fluid under pressure to apply braking power to said mechanism and operative upon the release of fluid under pressure therefrom for relieving said mechanism of braking power, a triple valve device operative to control the supply of fluid under pressure to and the release of fluid under pressure from said brake cylinder, a reservoir, valve means operative to supply fluid under pressure released from the brake cylinder by said triple valve device to said reservoir, a piston device operative by fluid under pressure for operating said mechanism to release position and means subject to the pressure of fluid in said brake cylinder for controlling the supply of fluid under pressure from said reservoir to said piston device.

10. In a vehicle brake, the combination with a mechanism operative to control the application and release of the brakes, of a brake cylinder device operative by fluid under pressure for applying braking power to said mechanism and operative upon the release of fluid under pressure therefrom to relieve said mechanism of braking power, a normally charged reservoir, a piston device subject to fluid under pressure from said reservoir for normally maintaining said mechanism in release position, and means subject to the pressure of fluid supplied to the brake cylinder in initiating an application of the brakes for closing off the flow of fluid from said reservoir to said piston device and for venting fluid under pressure from said piston device to render said piston device ineffective to oppose the operation of said mechanism.

11. In a vehicle brake, the combination with a mechanism operative to control the application and release of the brakes, of a brake cylinder device operative by fluid under pressure for applying braking power to said mechanism and operative upon the release of fluid under pressure therefrom to relieve said mechanism of braking power, a reservoir charged with fluid under pressure, a piston device adapted to be operated by fluid under pressure from said reservoir for operating said mechanism to release position when substantially all of the fluid under pressure is released from the brake cylinder, and means subject to a predetermined brake cylinder pressure for closing off the supply of fluid under pressure from said reservoir to the piston device and for venting fluid under pressure from said piston device for rendering said piston device ineffective to influence the operation of said mechanism.

12. In a vehicle brake, the combination with a mechanism operative to control the application and release of the brakes, of a brake cylinder device operative by fluid under pressure for applying braking power to said mechanism and operative upon the release of fluid under pressure therefrom to relieve said mechanism of braking power, a reservoir charged with fluid under pressure, a piston device adapted to be operated by fluid under pressure from said reservoir for operating said mechanism to release position when substantially all of the fluid under pressure is released from the brake cylinder, means subject to a predetermined brake cylinder pressure for closing off the supply of fluid under pressure from said reservoir to said piston device and for venting fluid under pressure from said piston device for rendering said piston device ineffective to influence the operation of said mechanism, and means for retaining fluid under pressure in the brake cylinder.

13. In a vehicle brake, the combination with a mechanism operative to control the application and release of the brakes, of a brake cylinder device operative by fluid under pressure for applying braking power to said mechanism and operative upon the release of fluid under pressure therefrom to relieve said mechanism of braking power, a reservoir charged with fluid under pressure, a piston device adapted to be operated by fluid under pressure from said reservoir for operating said mechanism to release position when substantially all of the fluid under pressure is released from the brake cylinder, and a retainer valve device for maintaining brake cylinder pressure above said predetermined pressure.

14. In a vehicle brake, the combination with a mechanism operative to control the application and release of the brakes, of a brake cylinder device operative by fluid under pressure for applying braking power to said mechanism and operative upon the release of fluid under pressure therefrom to relieve said mechanism of braking power, a reservoir charged with fluid under pressure, a piston device adapted to be operated by fluid under pressure from said reservoir for operating said mechanism to release position when substantially all of the fluid under pressure is released from the brake cylinder, a valve device subject to a predetermined brake cylinder pressure for rendering said piston device ineffective to influence the operation of said mechanism, and means operative to maintain the brake cylinder pressure above said predetermined brake cylinder pressure.

15. In a brake apparatus, the combination with a member through which the brakes are applied and released, and means operated by variations in fluid pressure for applying and releasing the brakes through said member, of an additional device operated by fluid under pressure to urge said member to release position and means for maintaining fluid pressure on said device while the brakes remain released.

In testimony whereof I have hereunto set my hand, this 14th day of February, 1930.

CLYDE C. FARMER.